(12) United States Patent
Mogaki

(10) Patent No.: US 9,282,104 B2
(45) Date of Patent: Mar. 8, 2016

(54) ACCESS MANAGEMENT SERVICE SYSTEM AND METHOD FOR CONTROLLING SAME, AND NON-TRANSITORY COMPUTER READABLE MEDIUM

(71) Applicant: CANON KABUSHIKI KAISHA, Tokyo (JP)

(72) Inventor: Shunsuke Mogaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 14/216,236

(22) Filed: Mar. 17, 2014

(65) Prior Publication Data

US 2014/0304837 A1    Oct. 9, 2014

(30) Foreign Application Priority Data

Apr. 4, 2013    (JP) ................................. 2013-078986

(51) Int. Cl.
*G06F 21/62*    (2013.01)
*H04L 29/06*    (2006.01)
*G06F 21/33*    (2013.01)

(52) U.S. Cl.
CPC .............. *H04L 63/104* (2013.01); *G06F 21/33* (2013.01); *G06F 21/6218* (2013.01); *G06F 21/62* (2013.01)

(58) Field of Classification Search
CPC ... G06F 21/62; G06D 21/6218; H04L 63/104
See application file for complete search history.

(56) References Cited

U.S. PATENT DOCUMENTS

| 2006/0206925 | A1  | 9/2006  | Dillaway et al. ................... 726/5 |
| 2009/0300707 | A1* | 12/2009 | Garimella ........... H04L 63/0823 726/1 |
| 2011/0225643 | A1* | 9/2011  | Faynberg ................ G06F 21/31 726/10 |
| 2014/0033278 | A1* | 1/2014  | Nimashakavi et al. ........... 726/4 |

FOREIGN PATENT DOCUMENTS

JP    2006-254464    9/2006

OTHER PUBLICATIONS

D. Hardt, "The OAuth 2.0 Authorization Framework", [online], Jul. 31, 2012, [retrieved on Mar. 25, 2013], the internet <URL: htttp://tools.ietf.org/html/draft-ietf-oauth-v2-31>.

* cited by examiner

*Primary Examiner* — Linglan Edwards
(74) *Attorney, Agent, or Firm* — Fitzpatrick, Cella, Harper & Scinto

(57) ABSTRACT

An access management service system that manages use of a service provided by a resource service system, comprises: a holding unit which holds information of a user and information of a client system in a storage unit; a determination unit which, if an authorization request for use of the service is received from the client system due to an instruction from a user having authority to use the service, determines whether a group to which the user belongs and a group to which the client system belongs match based on the information held in the storage unit; and a presentation unit which, if the determination unit determines that the groups match, presents, to the user, a screen for instructing whether or not to permit delegation of the authority of the user to the client system.

9 Claims, 16 Drawing Sheets

AUTHORIZATION INFORMATION MANAGEMENT TABLE

| CLIENT ID (601) | AUTHORIZATION TOKEN ID (602) | REFRESH TOKEN ID (603) | CLIENT NAME (604) |
|---|---|---|---|
| sys0000002 | AT0000001 | RT0000001 | FORM SERVICE |
| ... | ... | ... | ... |

610

COORDINATED SERVICE INFORMATION TABLE

| CLIENT ID (611) | PASSWORD (612) | END POINT URL (613) | REDIRECTION URL (614) |
|---|---|---|---|
| sys0000002 | ************ | http://authz/oauth | http:/systemA/redirect |
| ... | ... | ... | ... |

FIG. 7

USER TABLE (700)

| USER ID (701) | PASSWORD (702) | USER TYPE (703) | TENANT ID (704) |
|---|---|---|---|
| uid0000001 | ******* | USER | 1001AA |
| sys0000001 | ************ | MULTI-TENANT CLIENT | 1000001AA |
| sys0000002 | ************ | SINGLE-TENANT CLIENT | 1001AA |
| uid0000002 | ******* | USER | 1002AA |
| ... | ... | ... | ... |

CLIENT TABLE (710)

| CLIENT ID (711) | CLIENT NAME (712) | REDIRECTION URL (713) |
|---|---|---|
| sys0000001 | EXTERNAL SERVICE SYSTEM A | http://systemA/redirect |
| sys0000002 | EXTERNAL SERVICE SYSTEM B | http://systemB/redirect |
| ... | ... | ... |

FIG. 8

AUTHORIZATION INFORMATION TABLE (800)

| AUTHORIZATION TOKEN ID (801) | TOKEN TYPE (802) | EXPIRATION DATE (803) | SCOPE (804) | REFRESH TOKEN ID (805) | REFRESH DUE (806) | CLIENT ID (807) | USER ID (808) |
|---|---|---|---|---|---|---|---|
| AT0000000 | AUTHORIZATION CODE | 2013/04/01 13:00:00 | RESOURCE A | | | sys0000001 | uid0000001 |
| AT0000001 | AUTHORIZATION TOKEN | 2013/04/01 14:00:00 | RESOURCE A | RT0000001 | 2013/04/01 14:00:00 | sys0000001 | uid0000001 |
| AT0000002 | AUTHORIZATION TOKEN | 2013/04/01 15:00:00 | RESOURCE A | RT0000002 | 2013/04/01 15:00:00 | sys0000001 | uid0000002 |
| ... | ... | ... | ... | ... | ... | ... | ... |

FIG. 9

CERTIFICATE MANAGEMENT TABLE

| SERIAL NUMBER | subject | DN |
|---|---|---|
| cer0000001 | CN=service1, OU=xxxx | CN=uid1000000, OU=1000001AA |
| cer0000002 | CN=service2, OU=xxxx | CN=uid1000001, OU=1000002AA |
| ... | ... | ... |

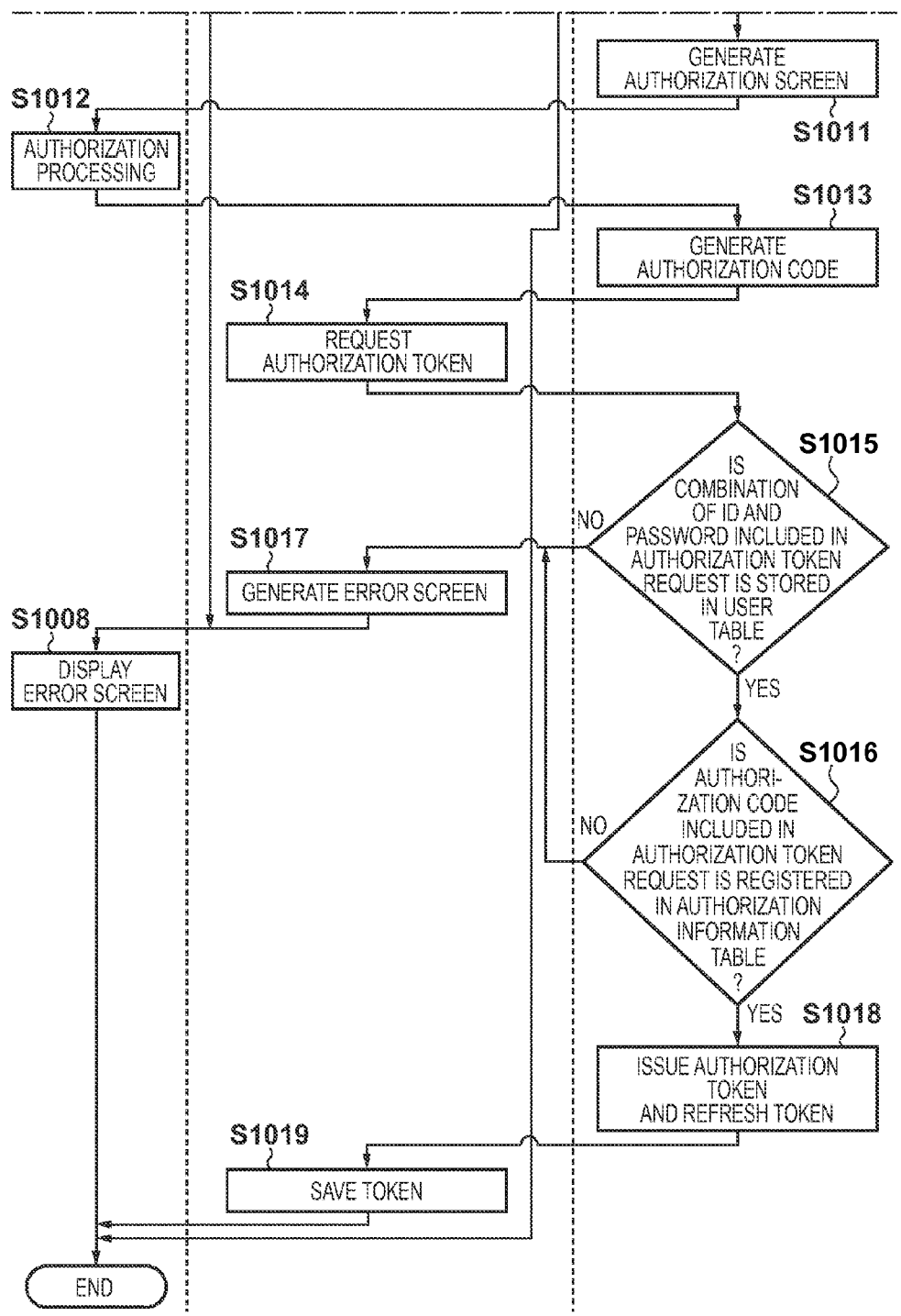

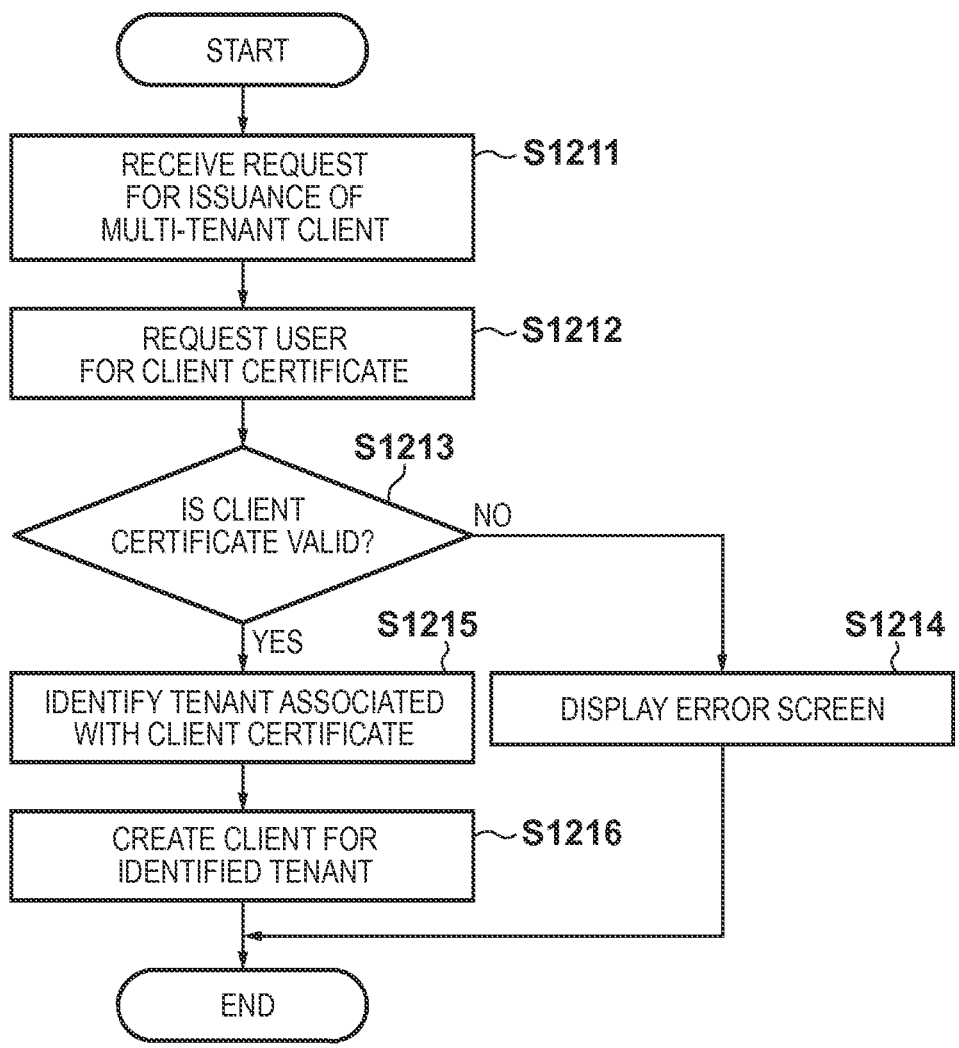

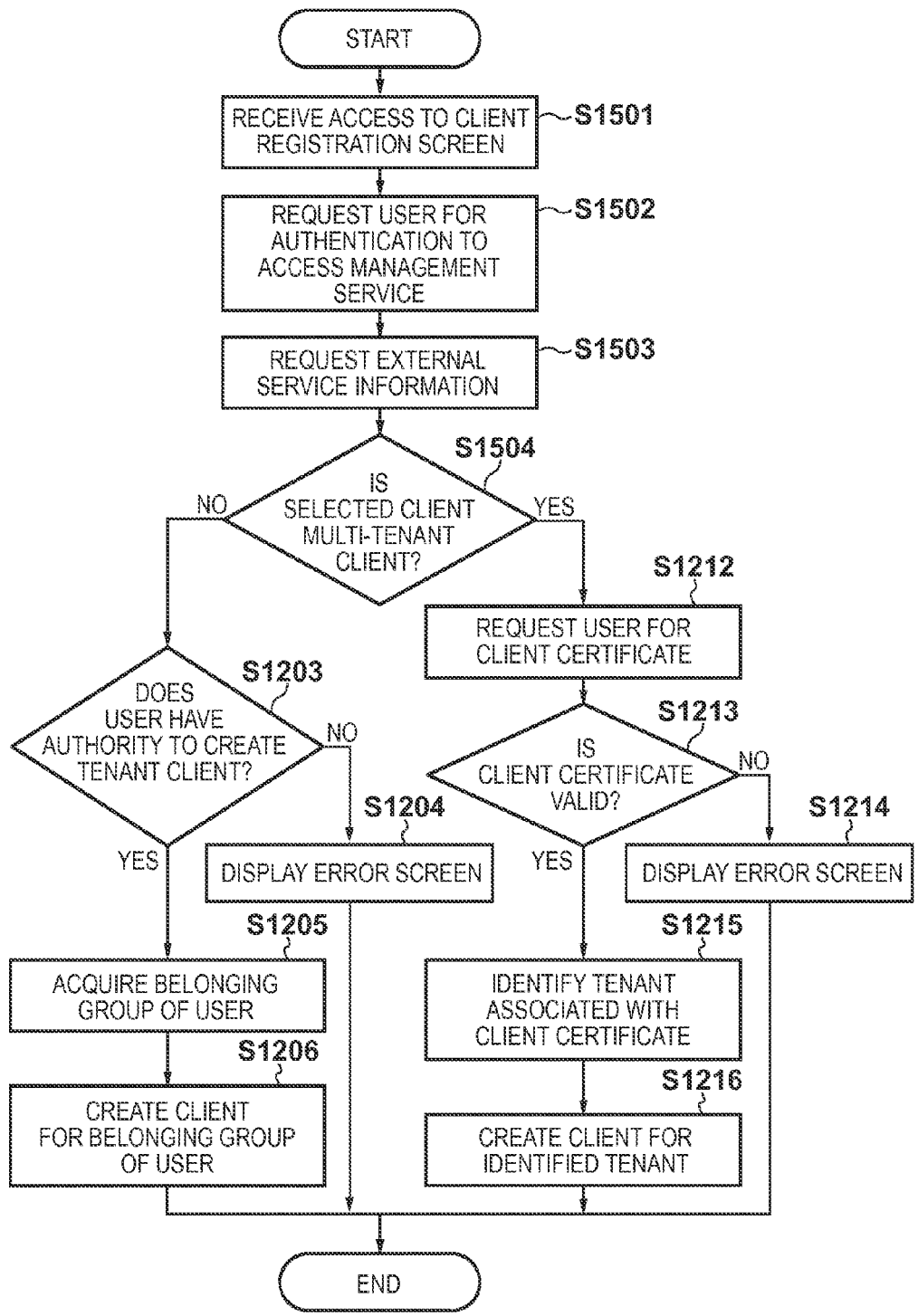

ACCESS MANAGEMENT SERVICE SYSTEM AND METHOD FOR CONTROLLING SAME, AND NON-TRANSITORY COMPUTER READABLE MEDIUM

BACKGROUND OF THE INVENTION

1. Field of the Invention

The present invention relates to a system and a method for controlling the same, an access management service system and a method for controlling the same, and a non-transitory computer readable medium.

2. Description of the Related Art

The recent popularization of cloud computing provides increasing opportunities for coordinating a plurality of services (e.g., document creation services) to create added values. On the other hand, the coordination of services poses several problems.

For example, as a result of coordination among services, more information than a user wishes to exchange is exchanged among services, resulting in the risk of leaking of user data and personal information. For example, it is not desirable that any service other than services that provide results desired by the user acquires the user data, the personal information and the like at the time of achieving service coordination among various services. On the other hand, from the standpoint of service providers, it is preferable that the arrangement of service coordination can be easily implemented.

Under such circumstances, the standard protocol called "OAuth" for implementing coordination of authorization has been defined (e.g., see, D. Hardt, "The OAuth 2.0 Authorization Framework", [online], Jul. 31, 2012, [retrieved on 2013-03-25], the internet <URL: http://tools.ietf.org/html/draft-ietf-oauth-v2-31>). According to OAuth, for example, data of a user that is managed by a given service A can be accessed by an external service B that is authorized by that user. At this time, the service A is supposed to clarify the range that can be accessed by the external service B, and thereafter obtain explicit authorization to access made by the external service B from the user. The explicit authorization performed by the user is referred to as "authorization operation".

If the user performs the authorization operation, the external service B receives a token (hereinafter referred to as "authorization token") that certifies that access has been approved by the service A, and subsequent access can be implemented by using the authorization token. Thereby, the authority of the user to the service A can be delegated to the external service B. Then, with the use of the authorization token, the external service B can access the service A by the authority of the user who has performed authorization, without the authentication information of the user. As a result, the external service B that has received authorization from the user and has acquired the authorization token is obliged to manage the authorization token in a strict and appropriate manner.

Furthermore, according to OAuth, in addition to confirming the side that delegates authority, the side to which authority is delegated can also be confirmed. For example, if the user authorizes the external service B to access the service A, it is possible to confirm whether the user has authority to use the service A, and confirm whether the external service B has authority to use the service A.

In regard with the confirmation of the side to which authority is delegated, there is a method in which the user explicitly specifies an external service to which authority is delegated at the time of performing an authorization operation (e.g., Japanese Patent Laid-Open No. 2006-254464). With this method, it is possible to achieve service coordination by authorization, while limiting external services.

In service coordination by authorization, in some cases, it is desired to prevent access from any external service other than a specific external service even if it is authorized by the user. An example of such a case is where an external service X, which is an intra-company system of a company A, and a cloud service Y are coordinated. If a user A of the company A has authority to use the cloud service Y, delegating authority to use the cloud service to the external service X allows the external service X to access information of the company A on the cloud service Y.

Here, it is assumed that the cloud service Y is a model that manages information of a plurality of companies on the same service in units of tenants. In that case, on the cloud service Y, a company B may exist as a tenant different from the company A and a user B of the company B may have authority to use the cloud service Y. If the user B delegates authority to use the cloud service Y to the external service X, the external service X can access the information of the company B on the cloud service Y. In this case, the external service X, which is an intra-system of the company A, can access the information of the company B, and therefore, a security problem could arise. In this way, there are cases where some external services should not be granted access even if they are authorized by the user.

However, according to the current OAuth, if each of the user B and the external service X has authority to use the cloud service Y, the authority to use the cloud service Y can be delegated from the user B to the external service X. Accordingly, to prevent the external service X from accessing the information of the company B, it is necessary to manage the range of information that can be accessed by the external service X in the cloud service Y.

However, this method cannot prevent an authorization operation itself and thus has a problem in that needless authority delegation processing can be executed. That is, the above-described method cannot prevent the authorization operation itself, and therefore, an authorization token can be issued by the user B performing the authorization operation and delegating authority to use the cloud service Y to the external service X. However, if the external service X tries to access the cloud service Y by using this authorization token, it is determined in the cloud service Y that the external service X does not have authority and thus the access is denied. In this way, the authority that cannot be used can be delegated, and an authorization token that cannot be used can be needlessly issued. In addition, it is not preferable that the user can delegate, to an external service, the access right to information that cannot be accessed by the external service.

The above-described method also has a problem in that a large burden is placed on the cloud service. For example, the cloud service has to manage external services that are granted access for each of all tenants. Moreover, each time an access request is made from an external service, the cloud service also has to determine whether access is granted or denied.

SUMMARY OF THE INVENTION

According to one aspect of the present invention, there is provided a system comprising: a resource service system configured to provide a service; and an access management service system configured to manage use of the service, wherein the access management service system includes: a holding unit configured to hold information of a user and information of a client system in a storage unit; a determination unit configured to, if an authorization request for use of the service is received from the client system due to an instruction from a user having authority to use the service, determine whether a group to which the user belongs and a group to which the client system belongs match based on the information held in the storage unit; and a presentation unit configured to, if the determination unit determines that the groups match, present, to the user, a screen for instructing whether or not to permit delegation of the authority of the user to the client system, and the resource service system includes a provision unit configured to, if access control information that is issued in response to an instruction given via the screen to permit delegation of the authority of the user is received from the client system, provide a service in response to confirmation of legitimacy of the access control information.

According to another aspect of the present invention, there is provided a method for controlling a system comprising a resource service system configured to provide a service, and an access management service system configured to manage use of the service, comprising: in the access management service system, holding information of a user and information of a client system in a storage unit; if an authorization request for use of the service is received from the client system due to an instruction from a user having authority to use the service, determining whether a group to which the user belongs and a group to which the client system belongs match based on the information held in the storage unit; and if it is determined that the groups match in the determining step, presenting, to the user, a screen for instructing whether or not to permit delegation of the authority of the user to the client system; and in the resource service system, if access control information that is issued in response to an instruction given via the screen to permit delegation of the authority of the user is received from the client system, providing a service in response to confirmation of legitimacy of the access control information.

According to another aspect of the present invention, there is provided an access management service system that manages use of a service provided by a resource service system, comprising: a holding unit configured to hold information of a user and information of a client system in a storage unit; a determination unit configured to, if an authorization request for use of the service is received from the client system due to an instruction from a user having authority to use the service, determine whether a group to which the user belongs and a group to which the client system belongs match based on the information held in the storage unit; and a presentation unit configured to, if the determination unit determines that the groups match, present, to the user, a screen for instructing whether or not to permit delegation of the authority of the user to the client system.

According to another aspect of the present invention, there is provided a method for controlling an access management service system that manages use of a service provided by a resource service system, comprising: holding information of a user and information of a client system in a storage unit; if an authorization request for use of the service is received from the client system due to an instruction from a user having authority to use the service, determining whether a group to which the user belongs and a group to which the client system belongs match based on the information held in the storage unit; and if it is determined that the groups match, presenting in the determining step, to the user, a screen for instructing whether or not to permit delegation of the authority of the user to the client system.

According to one aspect of the present invention, there is provided a non-transitory computer readable medium storing a program for causing a computer to function as: a holding unit configured to hold information of a user and information of a client system in a storage unit; a determination unit configured to, if an authorization request for use of the service is received from the client system due to an instruction from a user having authority to use a service provided by a resource service system, determine whether a group to which the user belongs and a group to which the client system belongs match based on the information held in the storage unit; and a presentation unit configured to, if the determination unit determines that the groups match, present, to the user, a screen for instructing whether or not to permit delegation of the authority of the user to the client system.

With the present invention, it is possible to prevent needless authority delegation in service coordination. Additionally, at the time of performing service coordination, it is possible to coordinate authorization within an appropriate range of information, without increasing the burden on the cloud service.

Further features of the present invention will become apparent from the following description of exemplary embodiments (with reference to the attached drawings).

BRIEF DESCRIPTION OF THE DRAWINGS

FIG. 6 illustrates examples of tables showing a data structure held by the external service system.

FIG. 7 illustrates examples of a user table and a client table held by the access management service system.

FIG. 8 illustrates a table showing a data structure of an authorization token held by the access management service system.

FIG. 9 illustrates a data management table of a client certificate held by the access management service system.

FIGS. 10A and 10B are flowcharts for issuing an authorization token.

FIG. 12B is a flowchart of processing for issuing a multi-tenant client.

FIG. 15 is a flowchart of processing for issuing a client.

DESCRIPTION OF THE EMBODIMENTS

Hereinafter, embodiments for implementing the present invention will be described with reference to the drawings.

Embodiment 1

A variety of online services are provided by various service providers on the Internet. Such online services include a stand-alone online service hosted by a single service provider, and a plurality of online services hosted by a plurality of service providers that are combined to achieve one solution. The latter is called "mashup", which looks in appearance as if it is a single website or web service. However, actually, a plurality of online services are coordinated and interlocked at the back end, and the necessary functions are combined to achieve a solution. Note that an online service as used herein refers to a group of functions provided by a website, a web application, a web service, or the like. The website, the web application, the web service or the like is software executed in a server computer.

In addition, the terms such as an authorization token, a refresh token, and an authorization code as used herein are those defined in OAuth and are in conformance therewith.

System Configuration

Figure 1:
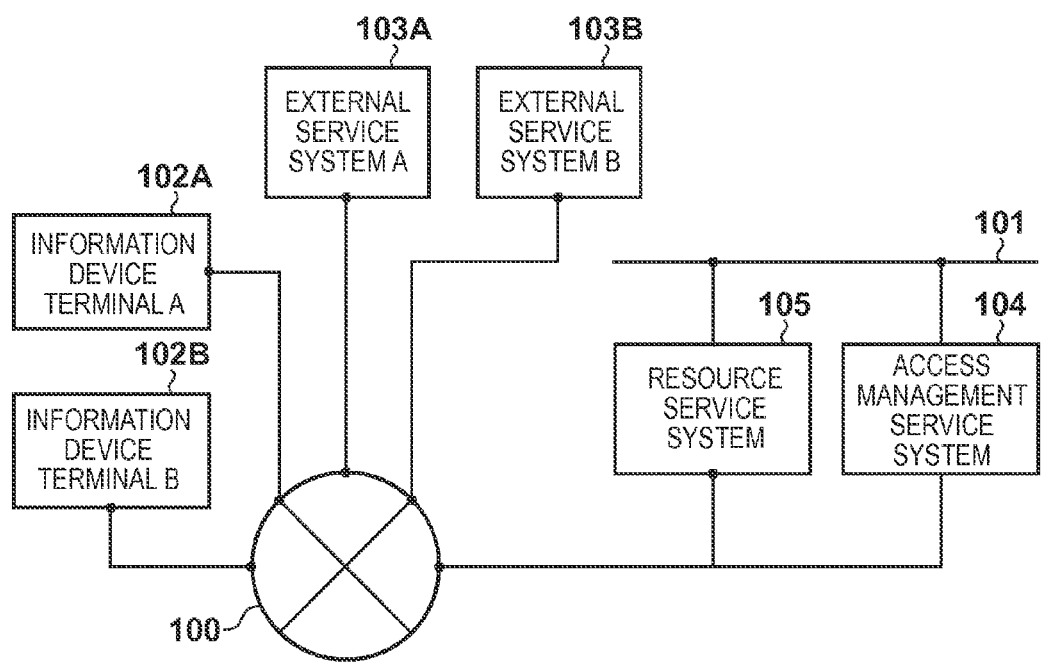
FIG. 1 is an overall view of a system.

FIG. 1 illustrates a network configuration in which various types of online services exist. An internet 100 is a public network, such as the Internet, to which a connection can be made from the outside. An intranet 101 is a private network, such as a LAN (Local Area Network), to which a connection cannot be made from the outside.

An information device terminal 102 is an information processing device, such as a personal computer or a mobile terminal, that is used when an online service is used via the internet 100. In OAuth, a user who operates the information device terminal 102 is called an "owner", and a web browser included in the information device terminal 102 is called a "user agent".

An external service system 103 is an online service system configured by mashing up a resource service system 105, which will be described later, online. The external service system 103 is called a "client" in OAuth, and therefore, the external service system 103 may also be referred to as a client (or client system) in the present embodiment.

An access management service system 104 is an authorization service system that manages authentication information and authorization information of the user. In OAuth, this is called an "authorization server".

A resource service system 105 is an online service system that provides a resource service such as a print service or a form service. In OAuth, this is called a "resource server". The resource service system 105 provides a resource service according to a request from the information device terminal 102 or the external service system 103 via the internet 100. Here, a single or a plurality of resource services may be installed in the resource service system.

Note that each of the information device terminal 102, the external service system 103, the access management service system 104, and the resource service system 105 may be configured on a separate LAN, or may be configured on the same LAN. The access management service system 104 and the resource service system 105 may be configured on the physically same device.

Each of the authorization server and the resource server may not be configured by a single server, but may be a server group composed of a plurality of servers. If the term authorization server system is used, it refers to a single server or a group of a plurality of servers that includes an authorization service module. Likewise, if the term resource server system is used, it refers to a single server or a plurality of servers that includes a resource service.

Hardware Configuration

Figure 2:
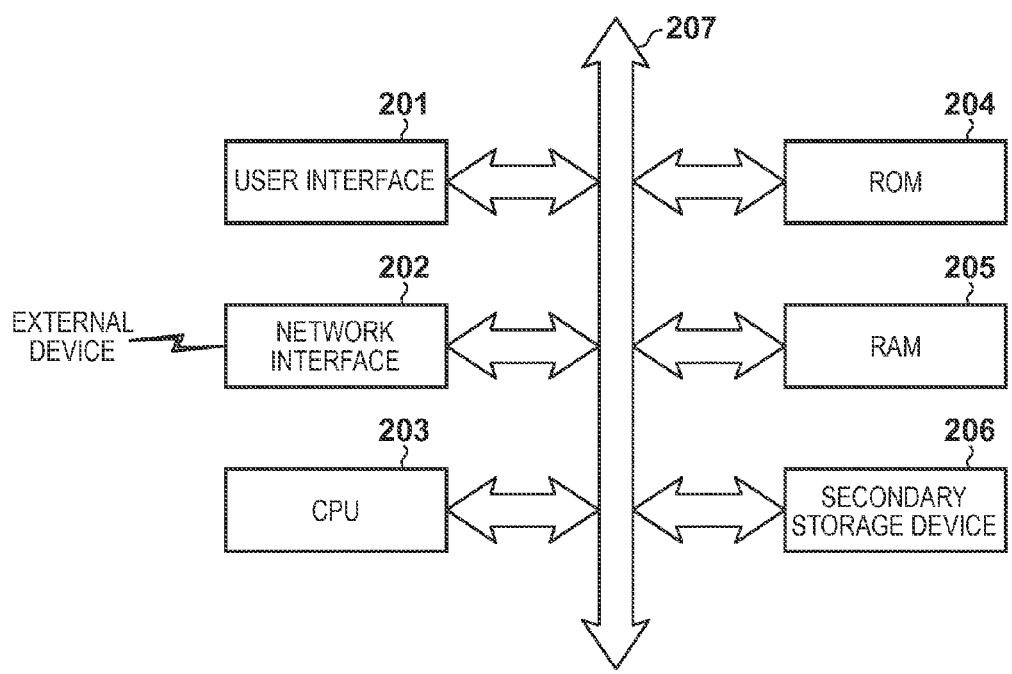
FIG. 2 illustrates an exemplary configuration of hardware of a server.

FIG. 2 illustrates an exemplary hardware configuration of a server in which various services shown in FIG. 1 are disposed. A user interface 201 is hardware for inputting and outputting information, such as a display, a keyboard, or a mouse. A computer that does not include such hardware can be connected or operated from another computer by using a remote desktop, for example.

A network interface 202 is hardware that connects to a network such as a LAN to communicate with another computer or a network device. A CPU 203 implements various services by executing a program that is read from a ROM 204, a RAM 205, a secondary storage device 206 or the like. The ROM 204 is a storage device in which a built-in program and data are recorded. The RAM 205 is a temporary memory area. The secondary storage device 206 is an external storage device typified by an HDD. These components are connected via an input/output interface 207.

Software Configuration

Figure 3:
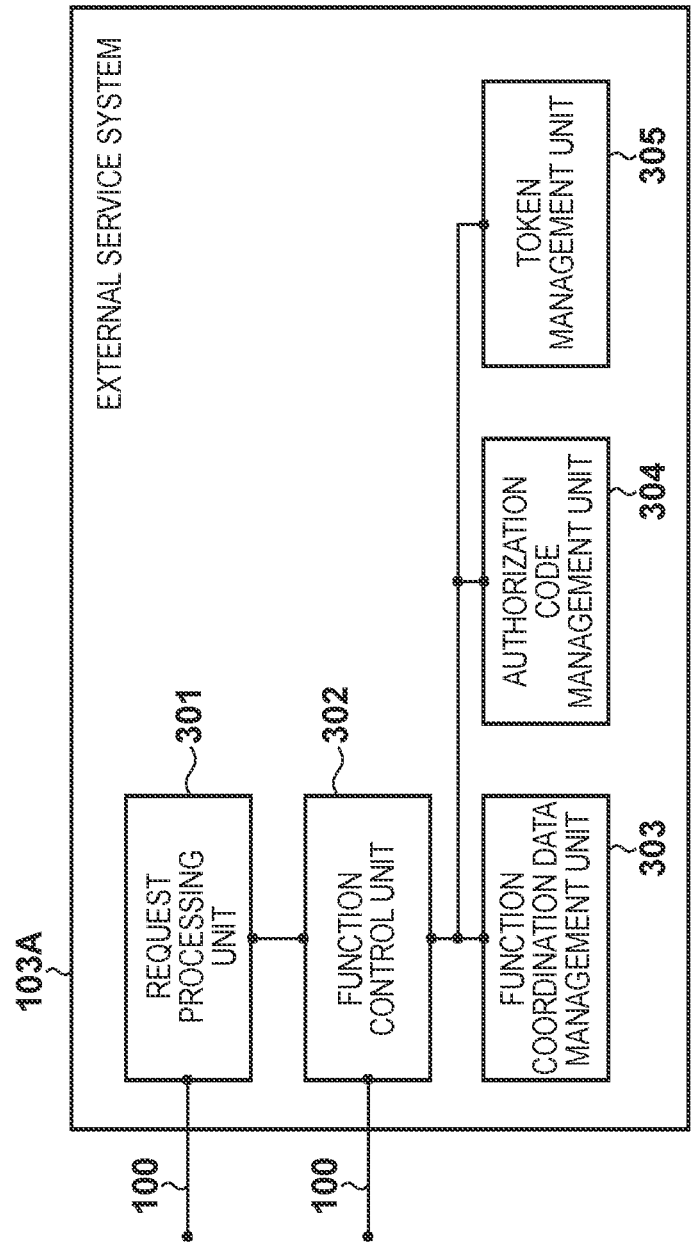
FIG. 3 illustrates an exemplary configuration of software of an external service system.

FIG. 3 is a block diagram showing an exemplary software configuration of the external service system 103.

A request processing unit 301 processes a function request received by the external service system 103 via the internet 100. A function control unit 302 receives the request from the request processing unit 301, performs the necessary processing according to the request, and returns response data to an invoker. A function coordination data management unit 303 manages data for generating a request to a system with which the external service system 103 is coordinated. An authorization code management unit 304 manages data of the authorization code. A token management unit 305 manages authorization information data.

Figure 4:
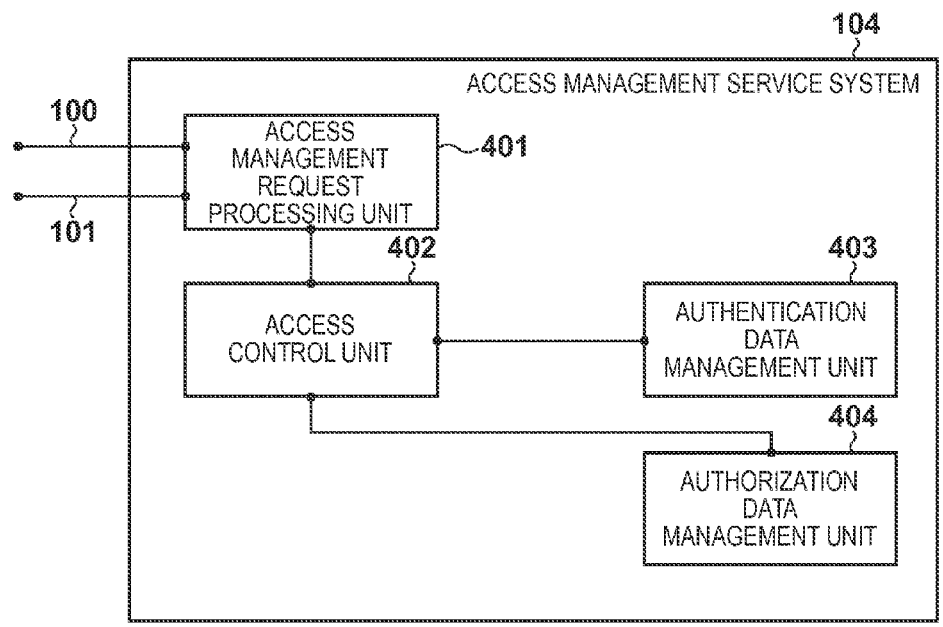
FIG. 4 illustrates an exemplary configuration of software of an access management service system.

FIG. 4 is a block diagram showing an exemplary software configuration of the access management service system 104.

An access management request processing unit 401 processes authentication and authorization requests received by the access management service system 104 via the internet 100 and the intranet 101. Additionally, the access management request processing unit 401 returns the response data returned from an access control unit 402 to the invoker. The access control unit 402 generates response data to the authentication and authorization requests based on the data acquired from an authentication data management unit 403 and an authorization data management unit 404, and returns the response data to the access management request processing unit 401. The authentication data management unit 403 manages user account data. The authorization data management unit 404 manages authorization information data.

Figure 5:
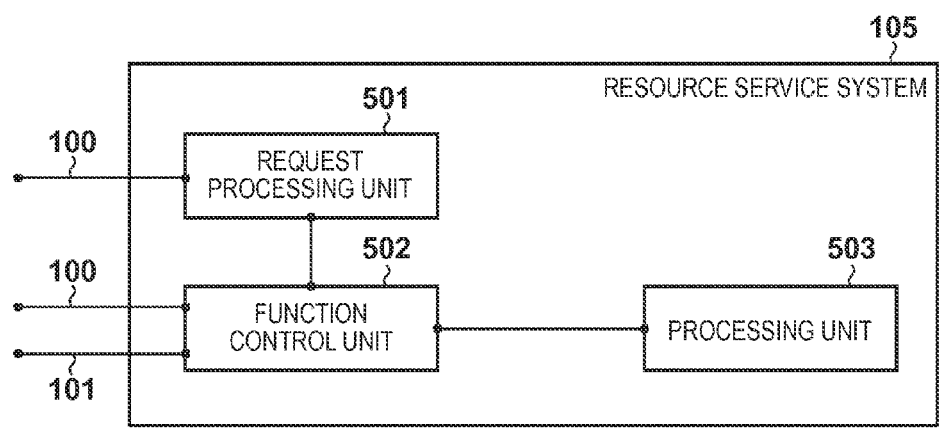
FIG. 5 illustrates an exemplary configuration of software of a resource service system.

FIG. 5 is a block diagram showing an exemplary software configuration of the resource service system 105.

A request processing unit 501 receives requests to the resource service via the internet 100. For example, if the resource service is a form service, the request processing unit 501 receives a request to generate form data and a request to acquire form data as the requests. A function control unit 502 performs the necessary processing according to the requests received by the request processing unit 501, and returns response data to the invoker. Additionally, the function control unit 502 transmits an authentication request to the access management service system 104 via the intranet 101, and receives the authentication result. Further, the function control unit 502 transmits a request to confirm the authorization to the access management service system 104, and receives the authorization confirmation result. A processing unit 503 receives the request from the function control unit 502, performs processing according to the request, and returns response data to the function control unit 502. For example, in the case of a form service, the processing unit 503 receives a request to generate a form data, and generates form data.

Exemplary Configuration of Management Table

FIG. 6 illustrates an example of the data structure of authorization information and management information of the external service system held by the external service system 103 in the form of tables. The authorization information and information relating to authorization are managed in an authorization information management table 600, and the management information of the external service system is managed in a coordinated service information table 610.

The authorization information management table 600 shown in FIG. 6 includes a client ID 601 indicating the coordinated system, an authorization token ID 602 indicating the authorization information, a refresh token ID 603 indicating update authorization information, and a client name 604 indicating the coordinated system name. In the client ID 601, an ID (identifier) for uniquely identifying the external service system 103 shown in FIG. 1 is saved. In the authorization token ID 602, an ID for uniquely identifying the authorization token, which is access control information issued by the access management service system 104, is saved. In the refresh token ID 603, an ID for uniquely identifying the refresh token issued by the access management service system 104 is saved.

The coordinated service information table 610 shown in FIG. 6 includes a client ID 611 and a password 612 for authenticating the external service system 103, and an end point URL 613 and a redirection URL 614 that are used during authorization. The client ID 611 and the password 612 are pieces of information that are issued by the access management service system 104, which will be described later, and the same pieces of information are stored in a user table 700, which will be described later. Furthermore, the same information as the redirection URL 614 is also stored in a client table 710, which will be described later. Note that the end point URL 613 is the URL of an endpoint for OAuth that is published by the access management service system 104. The details of the processing of the data stored in the data structure shown in FIG. 6 will be described later.

FIG. 7 illustrates an example of the data structure of user information and system information held by the access management service system 104 in the form of tables. The user information is managed in a user table 700, and the system information is managed in a client table 710.

The user information managed here is the account information of users and the external service system managed by the access management service system 104. Note that the account information of the external service system is authentication information that is used for client authentication performed by the authorization server in a sequence of OAuth, which will be described later. In the present embodiment, the account of the external service system 103, which is a client, is registered.

The user table 700 shown in FIG. 7 includes a user ID 701, a password 702, a user type 703, and a tenant ID 704. The user type 703 indicates whether the account is a user or a client. Furthermore, if the user type 703 is a client, it indicates whether the client has limited or unlimited access to information. In the present embodiment, a client having unlimited access to information is referred to as "multi-tenant client", and a client having limited access to information is referred to as "single-tenant client".

If authority is delegated, a multi-tenant client can access information of a group to which the user who has delegated authority belongs, regardless of its belonging group, which will be described later. Specifically, if a multi-tenant client belonging to group "1000001AA" receives authority delegation from a user belonging to group "1001AA", the multi-tenant client can access data of a different group "1001AA". Accordingly, the multi-tenant client can receive authority delegation from all users. On the other hand, a single-tenant client can only access information of a group to which it belongs, in accordance with the definition of a belonging group, which will be described later. Specifically, a single-tenant client belonging to group "1001AA" can only access data in "1001AA". Accordingly, the single-tenant client only receives authority delegation from a user in the same group "1001AA".

A tenant ID 704 indicates information for uniquely identifying a group to which the relevant account belongs. A group defines a range that can be accessed by the account managed by the access management service system 104, and the group may be a company, for example. Within the same group, access from an account to information of another account and information of its own group are granted in accordance with the authority of the account. Specifically, a user having the administrator authority and belonging to group "1001AA" can reference another user account information within group "1001AA", and can reference information of group "1001AA". However, even though the user of group "1001AA" has the administrator authority, she/he cannot reference account information of another group "1002AA" or information of group "1002AA".

The client table 710 shown in FIG. 7 includes a client ID 711, a client name 712, and a redirection URL 713. The client ID 711 is associated with the user ID 701 of the user table 700, and these IDs can be referenced to each other. The client name 712 and the redirection URL 713 are values that are used at the time of issuing an authorization token in a sequence of OAuth, which will be described later. The details of the processing of the data stored in the data structure shown in FIG. 7 will be described later.

FIG. 8 illustrates an example of a data structure of authorization information held by the access management service system 104 in the form of a table. An authorization information table 800 includes an authorization token ID 801, a token type 802, an expiration date 803, a scope 804, a refresh token ID 805, a refresh due 806, a client ID 807, and a user ID 808. The details of the processing of the data stored in the data structure shown in FIG. 8 will be described later.

FIG. 9 illustrates an example of a data structure of client certificate management information held by the access management service system 104 in the form of a table. A certificate management table 900 includes a serial number 901, a subject 902, and a DN 903 of a client certificate. The details of the processing of the data stored in the data structure shown in FIG. 9 will be described later.

Processing Flow

Figure 10A:
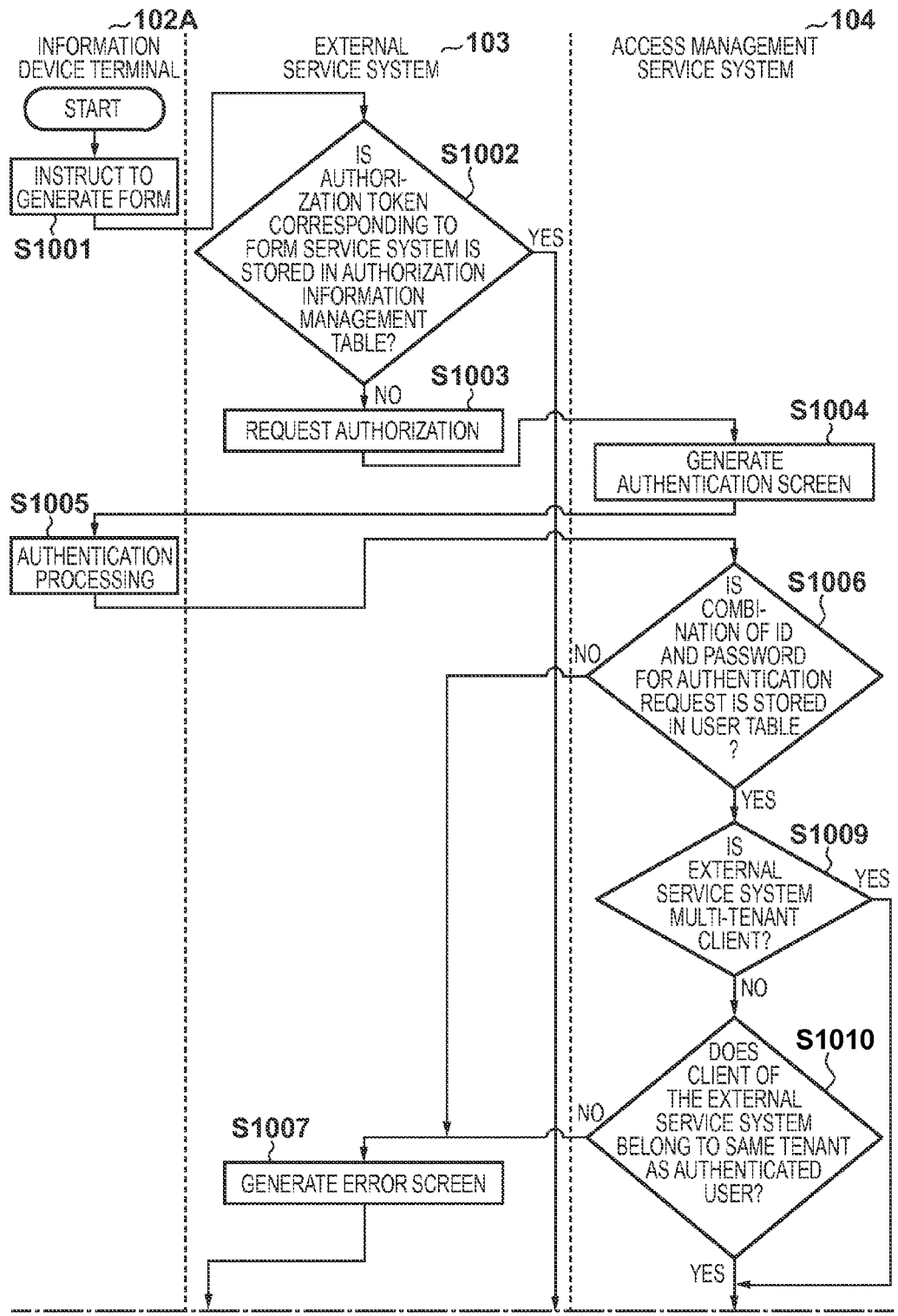

FIGS. 10A and 10B illustrate flows in which the access management service system 104 receives a request from a user operating the information device terminal 102 and issues an authorization token that permits use of the resource service system 105 to the external service system 103. In the present example, a description will be given assuming that the resource service is a form service and the user has instructed to generate a form. It is also assumed that the external service system 103 is managed as a user ID "sys0000002" in the user table 700 (FIG. 7) on the access management service system 104.

Additionally, it is assumed that the external service system 103 and the form service system (resource service system 105) are online service systems separately hosted by different service providers. Furthermore, access to the form service system from another service is controlled by the access management service system 104.

The processes in the present flow are implemented by a CPU in a processing entity reading out a program according to the present embodiment that is stored in a storage unit such as a secondary storage device onto a RAM and executing the program.

In S1001, the information device terminal 102A receives a request for generation of a form from a user A, and gives an instruction to generate a form to the external service system 103.

In S1002, the external service system 103 receives the form generation instruction from the information device terminal 102A. Thereafter, the external service system 103 references the authorization information management table 600 (FIG. 6) and confirms whether the authorization token for the form service system is held.

If the authorization token for the form service system is held (YES in S1002), the authorization token issuance flow ends. If the authorization token for the form service system is not held (NO in S1002), in S1003, the external service system 103 makes an authorization request to the access management service system 104 due to the form generation instruction from the user. The authorization request includes the information of the client ID 601 and the redirection URL 614 in the coordinated service information table 610. At this time, according to OAuth, the authorization request may be configured to include a scope indicating range of authority over which authorization is to be received. In the present embodiment, a description will be given assuming that a scope A is requested as the scope.

In S1004, upon receiving the authorization request from the external service system 103, the access management service system 104 generates an authentication screen (not shown) that prompts the user A to perform authentication processing, and displays the authentication screen in a web browser (not shown) included in the information device terminal 102A.

In S1005, the information device terminal 102A receives a user ID and a password from the user A via the authentication screen displayed in the web browser (not shown) on the information device terminal 102. Thereafter, the information device terminal 102A sends the received user ID and password to the access management service system 104 as an authentication request.

In S1006, the access management service system 104 receives the authentication request from the information device terminal 102A, and verifies the user ID and the password. Specifically, the access management service system 104 confirms whether the combination of the user ID and the password included in the authentication request is registered in the user table 700 (FIG. 7) stored in the authentication data management unit 403. If the combination of the user ID and the password is registered in the user table 700 (YES in S1006), the access management service system 104 determines that the user A operating the information device terminal 102 is a user of the form service system. Thereafter, the procedure proceeds to S1009, and the processing continues.

If the combination of the user ID and the password is not registered in the user table 700 (NO in S1006), the access management service system 104 determines that the user A operating the information device terminal 102A is not a user of the form service system. Thereafter, the access management service system 104 returns an authentication error to the external service system 103 as a response to S1004.

In S1007, upon receiving the authentication error from the access management service system 104, the external service system 103 generates an authentication error screen (not shown) and sends the authentication error screen to the information device terminal 102A. Thereafter, in S1008, the information device terminal 102A displays an error screen in the web browser (not shown) included in the information device terminal 102A, and the processing ends.

In S1009, the access management service system 104 determines the user type of the external service system 103 that is a requestor of the authorization request. At this time, the access management service system 104 acquires the user type from the user table 700 by using the user ID of the external service system 103. Then, the access management service system 104 determines whether the external service system as the requestor is a client having limited access to information. If the user type is a user type having unlimited access to information (YES in S1009), the procedure proceeds to S1011. If the user type is a user type having limited access to information (NO in S1009), the procedure proceeds to S1010.

Specifically, the user ID of the external service that has made the request is "sys0000001", the user type in the user table 700 is "multi-tenant client". In this case, the access management service system 104 determines that the external service system that has made the request is a client having unlimited access to information (YES in S1009). On the other hand, if the user ID of the external service that has made the request is "sys0000002", the user type in the user table 700 is "single-tenant client". In this case, the access management service system 104 determines that the external service that has made the request is a client having limited access to information (NO in S1009).

In the example illustrated here, the user ID of the external service system 103 is "sys0000002", and therefore, the access management service system 104 determines that the external service system 103 is a client having limited access to information.

In S1010, the access management service system 104 confirms the belonging group of each of the user who has made the authorization request and the external service system 103. At this time, the access management service system 104 acquires the tenant IDs of the user and the external service from the user table 700. Then, the access management service system 104 compares the acquired tenants ID, and determines whether they match. If the client belongs to the same group as the user (YES in S1010), the access management service system 104 determines that the client is permitted to access the same information that can be accessed by the user, and proceeds to S1010. On the other hand, if the client and the user belong to different groups (NO in S1010), the access management service system 104 determines that the client must not access the information that can be accessed by the user, thus assumed that an error has occurred, and proceeds to S1007.

In the example illustrated here, the user ID of the external service system 103 is "sys0000002", and the tenant ID is "1001AA". Here, if the user who has logged in S1006 is "uid0000001", the tenant ID of the user is "1001AA". In this case, the client and the user belong to the same group (tenant), and the access management service system 104 determines that the external service system 103 can access the information to which access is granted by the user. On the other hand, if the user is "uid0000002", the tenant ID of the user is "1002AA". In this case, the client and the user belong to different groups, and the access management service system 104 determines that the client should not access data even if the user grants access to that data.

In S1011, the access management service system 104 acquires the client information from the client table 710, generates an authorization screen 1100, which will be described later, and transmits the authorization screen 1100 to a web browser (not shown) included in the information device terminal 102A.

In S1012, the information device terminal 102A presents the authorization screen 1100 to the user via the web browser. Thereafter, upon receiving the pressing of an authorization button 1102 on the authorization screen 1100 from the user, the information device terminal 102A transmits an authorization approval to the access management service system 104.

In S1013, the access management service system 104 generates an authorization code based on the received authorization approval, and stores the authorization code in the authorization information table 800 (FIG. 8). At this time, the access management service system 104 registers the ID of the issued authorization code in the authorization token ID 801 and "authorization code" in the token type 802, the expiration date 803, and the specified "scope A" in the scope 804 in the authorization information table 800. Additionally, the access management service system 104 registers the client ID received from the external service system 103 during the authorization request in S1003 in the client ID 807, and the user ID associated with the authentication information in the user ID 808. Thereafter, the access management service system 104 redirects the web browser (not shown) included in the information device terminal 102A to the external service system 103 as an authorization response. At this time, the access management service system 104 returns the information of the generated authorization code to the external service system 103.

In S1014, the external service system 103 stores the received authorization code information in the authorization information management table 600. Thereafter, the external service system 103 makes request for an authorization token to the access management service system 104. This request includes the authorization token ID corresponding to the authorization code, the client ID and the password that are stored in the coordinated service information table 610, and the redirection URL.

In S1015, the access management service system 104 receives the authorization token request, and authenticates the external service system 103. Specifically, the access management service system 104 confirms whether the combination of the client ID and the password included in the authorization token request is registered in the user table 700 stored in the authentication data management unit 403. If the combination of the client ID and the password is registered in the user table 700 (YES in S1015), the access management service system 104 authenticates the external service system 103, then proceeds to S1016, and continues processing. If the combination of the client ID and the password is not registered in the user table 700 (NO in S1015), the access management service system 104 does not authenticate the external service system 103 and determines that an authentication error has occurred. In that case, the access management service system 104 transmits the authentication error to the external service system 103, and proceeds to S1017.

In S1016, the access management service system 104 verifies the authorization code included in the authorization token request. Specifically, the access management service system 104 verifies that the authorization token ID corresponding to the authorization code is registered in the authorization information table 800 and is within the expiration period. Additionally, the access management service system 104 confirms whether the combination of the client ID and the redirection URL is registered in the client table 710.

If the verification of the authorization code is successful, the access management service system 104 determines that use of the form service is permitted (YES in S1016) and proceeds to S1018, and the access management service system 104 continues the processing. If the verification of the authorization code fails, the access management service system 104 determines that use of the form service is not permitted (NO in S1016). In that case, the access management service system 104 transmits an authorization error to the external service system 103, and proceeds to S1017.

In S1017, the external service system 103 receives the authentication error or the authorization error from the access management service system 104. The external service system 103 generates an authentication error screen (not shown) or an authorization error screen (not shown) corresponding to the received error, and sends the error screen to the information device terminal 102. In S1008, the information device terminal 102A displays the error screen received from the external service system 103, and the processing ends.

In S1018, the access management service system 104 generates an authorization token, and registers the authorization token in the authorization information table 800. At that time, the access management service system 104 registers the ID of the issued token in the authorization token ID 801, "authorization token" in the token type 802, the expiration date 803, and the scope 804. Then, the access management service system 104 registers the client ID 807 and the user ID 808 as the information transferred from the authorization code. At this time, the access management service system 104 may issue a refresh token for refreshing the authorization token. If a refresh token is issued, the access management service system 104 registers the refresh token ID 805 and the refresh due 806.

Thereafter, the access management service system 104 returns the generated authorization token and refresh token to the external service system 103 as a response to S1014.

In S1019, the external service system 103 stores the authorization token and the refresh token received from the access management service system 104 in the authorization information management table 600 managed in the token management unit 305. Specifically, the external service system 103 sets an ID corresponding to the received authorization token in the authorization token ID 602, and an ID corresponding to the received refresh token in the refresh token ID 603.

The authorization token and the refresh token that have been issued in this way are saved, and thereby the flow for issuing an authorization token ends.

With the use of the authorization token issued by the above-described processing flow, the external service system 103 can use the functions provided by the resource service system 105. For example, if the resource service is a form service, the external service system 103 passes the issued authorization token to the form service, and can use the form service. The following describes processing executed when the external service system 103 uses the form service with the use of the authorization token.

Example of Use of Service with Authorization Token

The form service passes the authorization token received from the external service system 103 and a scope including a usage authority of the form service to the access management service system 104, and requests verification of the authorization token.

The access management service system 104 verifies the received access token. Specifically, the access management service system 104 confirms whether the received access token is registered in the authorization information table 800. If the access token is registered, the access management service system 104 confirms the expiration date 803 and determines whether the access token is within the validity period. Additionally, the access management service system 104 confirms the scope 804, and confirms whether the access token has a specified scope. If the access token is registered, within the validity period, and has the specified scope, the access management service system 104 returns access token validation to the form service. If the access token is not registered or outside the validity period, or does not have the specified scope, the access management service system 104 returns access token invalidation to the form service.

If the access token is valid, the form service sends the authorization token to the access management service system 104 and acquires the information of the user who has performed authorization. The access management service system 104 confirms the user ID 808 in the authorization information table 800 based on the authorization token received from the form service, and identifies the user ID of the user who has performed authorization. After that, the access management service system 104 acquires the information of the user who has performed authorization from the user table 700, and returns the user information to the form service.

Here, the access management service system 104 may confirm the user type of the authorized client. If the authorized client is a single-tenant client, the access management service system 104 compares the tenant ID of the user who has performed authorization and the tenant ID of the client. If the client is a single-tenant client and the tenant IDs of the user and the client are different, the client cannot access the user information of a different group. Thus, the access management service system 104 returns an error to the form service.

Upon acquiring the information of the user who has performed authorization, the form service generates a form based on the form data within the group to which the user who has performed authorization belongs, among the information that it manages, and transmits the form to the external service system 103. This enables the external service system 103 to use the authorization token to use the functions provided by the form service in response to the confirmation of the legitimacy of the authorization token.

Figure 11:
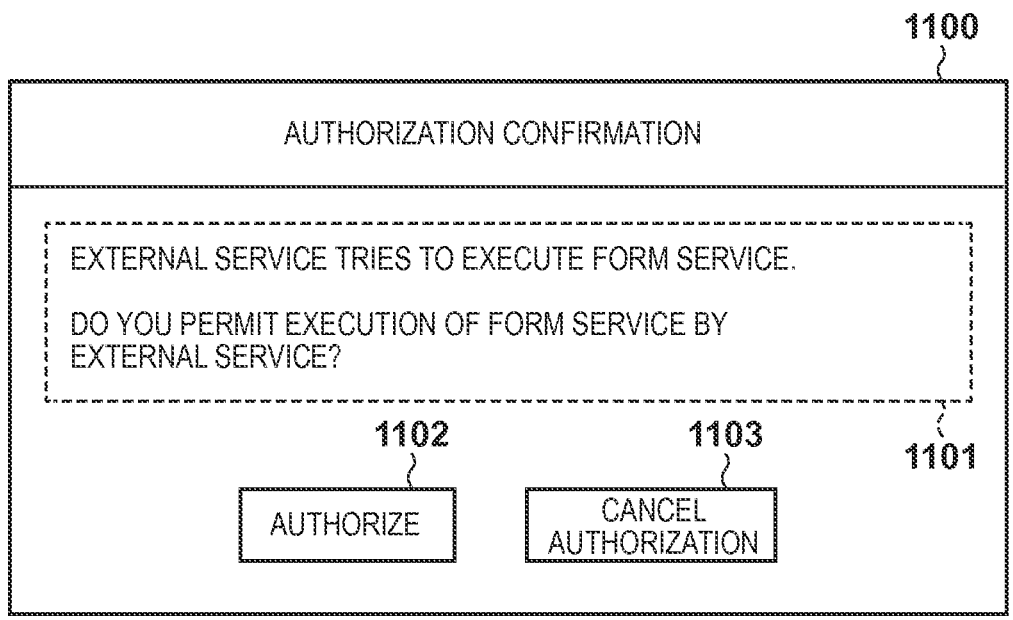
FIG. 11 illustrates an example of an authorization screen.

FIG. 11 illustrates an authorization screen 1100 that is generated by the access management service system 104 in S1011 of FIG. 10B. The authorization screen 1100 is made up of an information display unit 1101, an authorization button 1102, and an authorization cancel button 1103.

The information display unit 1101 presents, to the user, a service to be authorized and the information of the service performed by the authorized service. In the present embodiment, the service to be authorized is the external service system 103, and the service performed by the authorized service is the resource service system 105.

The authorization button 1102 is a button pressed by the user when approving authorization. The authorization cancel button 1103 is a button pressed by the user when denying authorization.

Processing for Issuing Client

Figure 12A:
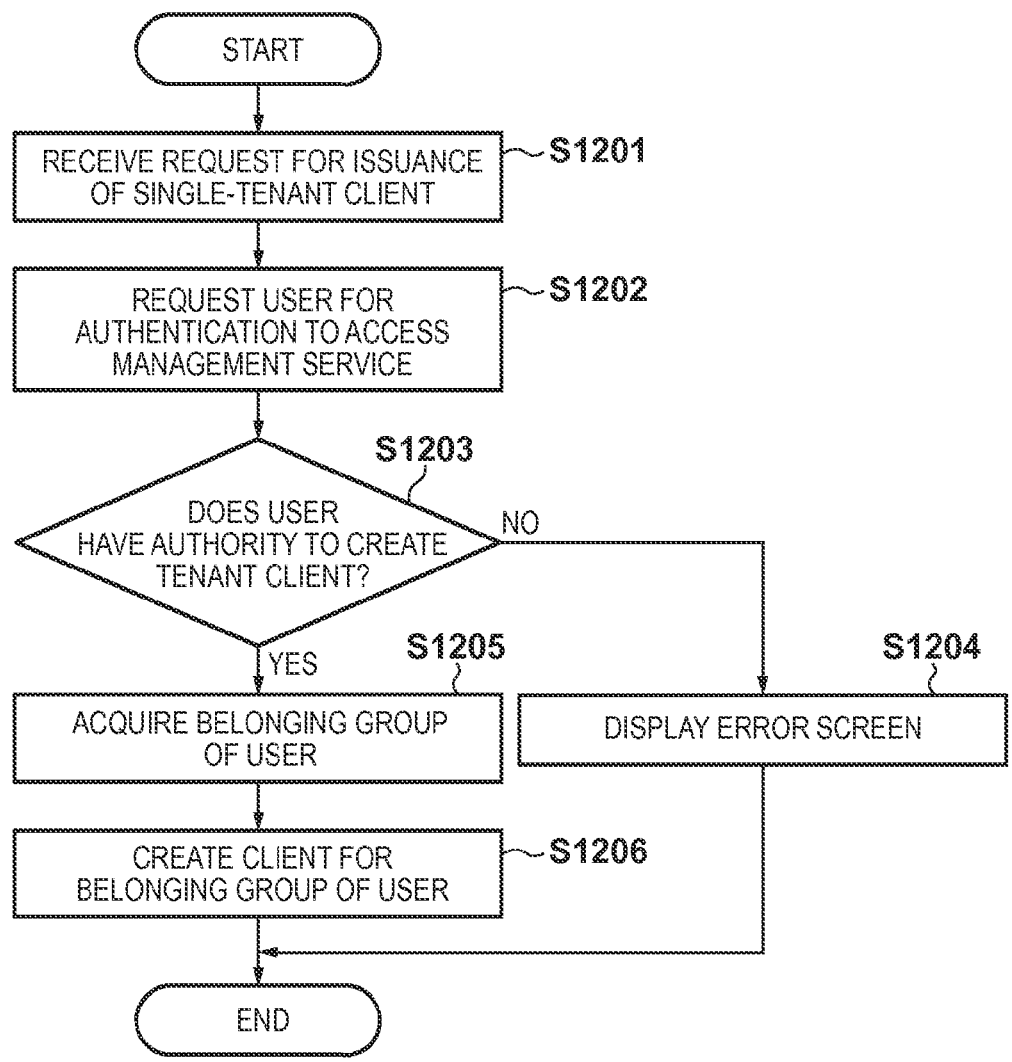
FIG. 12A is a flowchart of processing for issuing a single-tenant client.

FIGS. 12A and 12B illustrate a flow of processing for issuing clients for the access management service system 104 to identify the external service system 103. In the present embodiment, it is assumed that each of the clients has been created and issued before the flows of FIGS. 10A and 10B are performed.

According to the present embodiment, a multi-tenant client, if authorized, can perform processing on all tenants, and therefore can be considered as a tenant to which strong authority (first authority) is granted. Accordingly, for ensuring safety, it is necessary that a multi-tenant client can be issued only to an external service that is authorized by the access management service system 104.

On the other hand, a single-tenant client is a tenant having limited access to information. A single-tenant client receives authorization only from a user included in a group (tenant) to which the single-tenant client belongs, or in other words, it is a client to which weak authority (second authority) is granted. Accordingly, in each group, a user having authority to create a tenant client, such as an administrator, must be able to freely create a single-tenant client.

In the following processing flow, it is assumed that the authentication information of the user (issuance requestor) and the authority information of the client creation are defined in advance and held in the storage unit.

FIG. 12A is a flowchart of processing for issuing a single-tenant client in the access management service system 104. The present processing flow is implemented by the CPU 203 of the access management service system 104 reading out the program according to the present embodiment stored in the secondary storage device 206 to the RAM 205 and executing the program.

In S1201, the access management service system 104 receives a request for issuance of a single-tenant client from the user. In S1202, the access management service system 104 requests the user to input the authentication information. Then, the access management service system 104 authenticates the user based on the input information.

After successfully authenticating the user, the access management service system 104 confirms the authority of the user in S1203. If the user has authority to create a tenant client (YES in S1203), the procedure proceeds to S1205. If the user does not have authority to create a tenant client (NO in S1203), the procedure proceeds to S1204, and the access management service system 104 returns an error screen as a response to S1201. Then, the present processing flow ends.

In S1205, the access management service system 104 acquires the tenant ID from the user table 700 as the belonging group corresponding to the authenticated user. Thereafter, in S1206, the access management service system 104 creates a single-tenant client belonging to the acquired group based on the authority of the authenticated user, and registers the single-tenant client in the user table 700. The single-tenant client that is registered here has the user type "single-tenant client" and the same tenant ID as that of the user. Thereby, the present processing flow ends.

FIG. 12B is a flowchart of processing for issuing a multi-tenant client in the access management service system 104. The present processing flow is implemented by the CPU 203 of the access management service system 104 reading out the program according to the present embodiment stored in the secondary storage device 206 to the RAM 205 and executing the program.

In S1211, the access management service system 104 receives a request for issuance of a multi-tenant client from the user. In S1212, the access management service system 104 requests the user for a client certificate. It is assumed that the client certificate requested here is issued by the access management service system 104, and is distributed to a trusted external service system outside the present system. Note that the method of distribution is not particularly limited. Prior to S1212, it is possible to request the user to input the authentication information into the access management service system 104 as in S1202.

After receiving the client certificate from the user, the access management service system 104 verifies the legitimacy of the client certificate in S1213. The validation of the client certificate is performed by making comparison with the client certificate that has been registered in advance. Note that the method for registering the client certificate will be described later with reference to FIG. 13. If it is determined that the client certificate is valid by the validation (YES in S1213), the procedure proceeds to S1215. If it is determined that the client certificate is invalid (NO in S1213), the procedure proceeds to S1214, in which the access management service system 104 returns an error screen to the user as a response to S1211, and ends processing.

In S1215, the access management service system 104 acquires, from the certificate management table 900, information of the multi-tenant client that is to be created. In the present embodiment, the multi-tenant client is a client that can access the information of a plurality of groups if authorized, and therefore is created as a client belonging to a special group. The DN 903 includes information of a group that registers an external service system having the client certificate as a multi-tenant client. The creation of the correspondence between the client certificate created in advance and the group will be described later with reference to FIG. 13. The access management service system 104 acquires the DN 903 of the verified client certificate, and identifies a group for which a multi-tenant client is to be created.

In S1216, the access management service system 104 authenticates the user having authority to create a multi-tenant client based on the information of the DN 903. Thereafter, the access management service system 104 creates a multi-tenant client for the identified group by the authority of the authenticated user, and registers the multi-tenant client in the user table 700. The multi-tenant client registered here has the user type "multi-tenant client" and has the tenant ID that is identified from the DN 903 as its tenant ID. Thereby, the present processing flow ends.

Registration of Client Certificate

Figure 13:
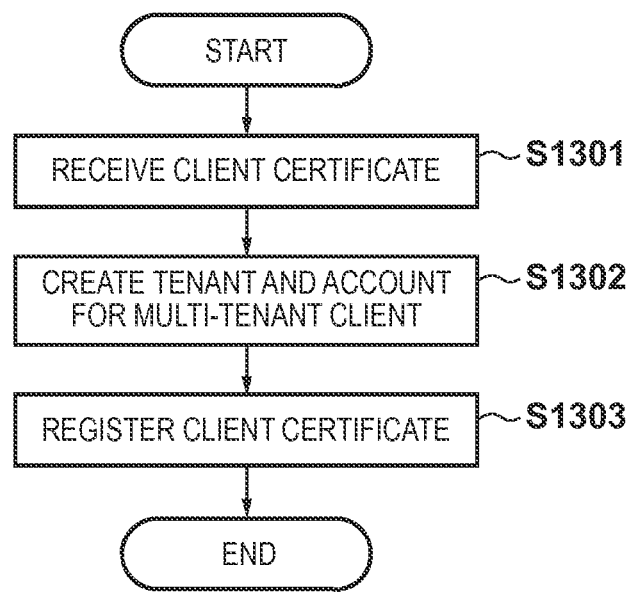
FIG. 13 is a flowchart for registering a client certificate for creating a multi-tenant client.

FIG. 13 illustrates a flow for registering a client certificate for permitting creation of a multi-tenant client in the access management service system 104. The present processing flow is implemented by the CPU 203 of the access management service system 104 reading out the program according to the present embodiment stored in the secondary storage device 206 into the RAM 205, and executing the program.

In S1301, the access management service system 104 receives a request for registration of a client certificate. At that time, the access management service system 104 receives a client certificate that has been created outside the system.

In S1302, the access management service system 104 newly creates an account for registering a multi-tenant client and a special group for the multi-tenant client. The created account is registered in the user table 700.

In S1303, the access management service system 104 registers the client certificate in the certificate management table 900. Here, values associated with the received client certificate are registered in the serial number 901 and the subject 902. Additionally, values associated with the information of the account and the client created in S1302 are registered in the DN 903. Thereby, the present processing flow ends.

According to the present embodiment, before displaying the authorization confirmation screen to the user during the authorization processing, the access management service system 104 determines the accessible range of an external service to which authority is to be delegated, and thereby it is possible to prevent unauthorized authority delegation and needless authority delegation. This makes it possible to manage an external service that can access only a specific data. Furthermore, access management is not needed on the external service side, thus making it possible to suppress the burden.

Further, a restriction is placed such that a tenant having unlimited access to information, or having strong authority cannot freely issue a client certificate, and only an authorized service can issue a client certificate. On the other hand, for a service having limited access to information, or having weak authority, any account having the creation authority in each service can freely issue a client certificate. Accordingly, it is possible to maintain security while maintaining the convenience in the system.

Embodiment 2

Next, a description will be given of a second embodiment for registering an external service in the access management service system 104 with reference to the drawings.

Client Registration Screen

Figure 14:
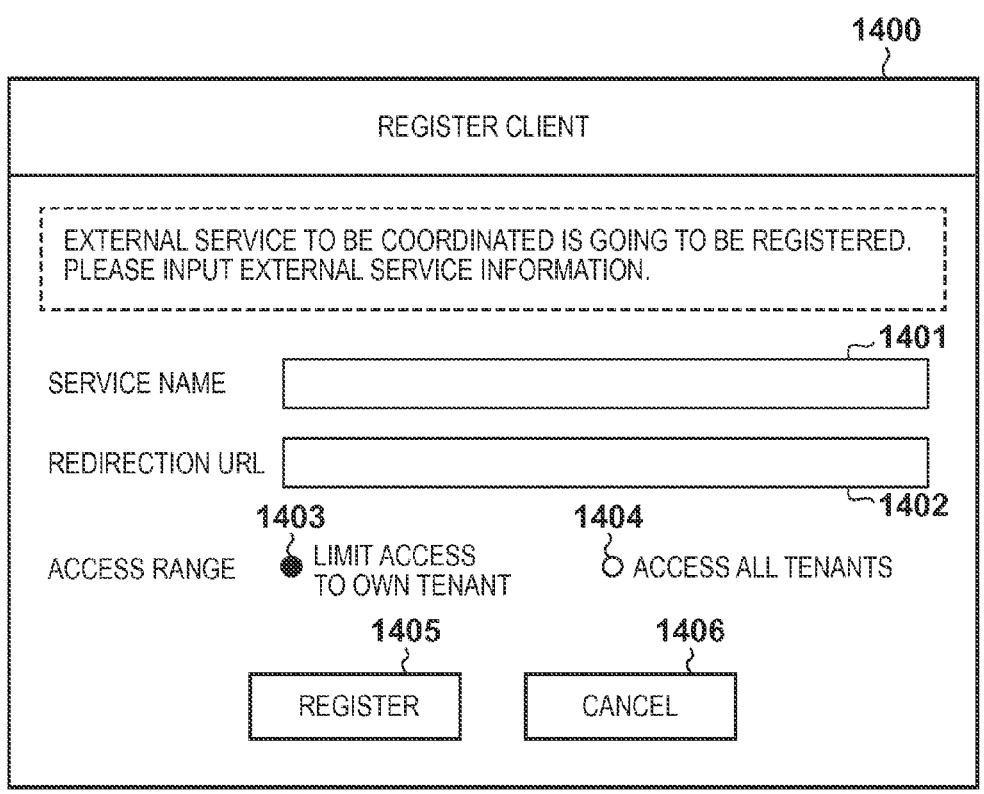
FIG. 14 illustrates an example of a client issuance screen.

FIG. 14 illustrates a client registration screen 1400 that is generated by the access management service system 104. The client registration screen 1400 includes a service name input unit 1401 and a redirection URL input unit 1402 as input units. Additionally, the client registration screen 1400 includes client selection units 1403 and 1404, a registration button 1405, and a registration cancel button 1406.

The service name input unit 1401 is a form to input the client name that is to be registered in the client name 712 of the client table 710. The redirection URL input unit 1402 is a form to input the URL that is to be registered in the redirection URL 713 of the client table 710.

The client selection units 1403 and 1404 are radio buttons one of which is selectable, and an access range corresponding to the usage is selected. A client corresponding to the access range selected here is created in the system. If the client selection unit 1403 is selected, a single-tenant client is created. If the client selection unit 1404 is selected, a multi-tenant client is created. Note that the selection units may be in the form of a drop-down selection, rather than in the form of buttons.

The registration button 1405 is a button pressed by the user when requesting client registration. The registration cancel button 1406 is a button pressed by the user when denying registration.

Processing Flow

FIG. 15 illustrates a processing flow for registering the external service system 103 in the access management service system 104. Note that the same processes as those in FIGS. 12A and 12B are denoted as the same reference numerals. The present processing flow is implemented by the CPU 203 of the access management service system 104 reading out a program according to the present embodiment stored in the secondary storage device 206 to the RAM 205 and executing the program.

In S1501, the access management service system 104 receives access to the client registration screen 1400. In S1502, the access management service system 104 requests the user to input the authentication information. After successfully authenticating the user, in S1503, the access management service system 104 displays the client registration screen 1400 and requests the user to input the information of an external service that is to be registered.

In S1504, the access management service system 104 determines an access range that has been requested to be registered (a client that is to be created). If the creation of a single-tenant client corresponding to the access range is requested (NO in S1504), the procedure proceeds to S1203, and the same flow as that of FIG. 12A follows thereafter. If the creation of a multi-tenant client corresponding to the access range is requested (YES in S1504), the procedure proceeds to S1212, and the same flow as that of FIG. 12B follows thereafter.

In addition to achieving the effect of Embodiment 1, Embodiment 2 enables the user to select an access range according to the usage and create a client without being conscious of whether the client is a multi-tenant client or a single-tenant client.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078986, filed Apr. 4, 2013, which is hereby incorporated by reference herein in its entirety.

What is claimed is:

1. A system comprising:
a resource service system configured to provide a service; and
an access management service system configured to manage use of the service,
wherein the access management service system includes:
a holding unit configured to hold information of a user and information of a multi-tenant client system in a storage unit;
a registration unit configured to grant a first authority or a second authority to information of the client system and to register the same in the holding unit, the first authority being an authority permitting access not only to a specific tenant but also to another tenant, and the second authority being an authority permitting access to the specific tenant,
wherein when granting an authority to information of the client system, if a certificate is received, the registration unit grants the first authority to the information of the client system, and if authentication information is received, the registration unit confirms a tenant based on the authentication information and grants the second authority permitting access of the confirmed tenant as the specific tenant to the information of the client system;
the access management system further including:
a determination unit configured to, if the second authority is granted to the client system when an authorization request for use of the service is received from the client system due to an instruction from a user having authority to use the service, determine whether a group to which the user belongs and a group to which the client system belongs match; and
a presentation unit configured to, if the determination unit determines that the groups match or if the first authority is granted to the client system, present a screen to the user, the screen for instructing whether or not to permit delegation of the authority of the user to the client system, and
wherein the resource service system includes a provision unit configured to, if access control information that is issued in response to an instruction given via the screen to permit delegation of the authority of the user is received from the client system, provide a service in response to confirmation of legitimacy of the access control information.

2. The system according to claim 1, wherein the access management service system further includes an issuance unit configured to issue the access control information in response to an instruction given via the screen presented by the presentation unit, to permit delegation of the authority of the user.

3. The system according to claim 1, further comprising a unit configured to determine whether the client system that has made the authorization request is granted the first authority,
wherein, if the client system is granted the first authority, the presentation unit presents the screen to the user regardless of whether the group to which the user belongs and the group to which the client system belongs match.

4. The system according to claim 1, wherein, if registration of a client system is requested so as to grant the first authority to the client system, the registration unit requests a client certificate issued by the access management service system and registers the client system in response to confirmation of legitimacy of the client certificate.

5. The system according to claim 1, wherein, if registration of a client system is requested so as to grant the second authority to the client system, the registration unit acquires information of authority of a user who has requested the registration, and registers the client system if the user has authority to the registration.

6. A method for controlling a system comprising a resource service system configured to provide a service, and an access management service system configured to manage use of the service, the method comprising:
in the access management service system,
holding information of a user and information of a multi-tenant client system in a storage unit;
granting a first authority or a second authority to information of the client system and registering the same in the storage unit, the first authority being an authority permitting access not only to a specific tenant but also to another tenant, and the second authority being an authority permitting access to the specific tenant,
wherein when granting an authority to information of the client system, if a certificate is received, the first authority is granted to the information of the client system, and if authentication information is received, a tenant is confirmed based on the authentication information and the second authority permitting access of the confirmed tenant as the specific tenant is granted to the information of the client system;
wherein in the access management system:
if the second authority is granted to the client system when an authorization request for use of the service is received from the client system due to an instruction from a user having authority to use the service, determining whether a group to which the user belongs and a group to which the client system belongs match; and if it is determined that the groups match or if the first authority is granted to the client system, presenting a screen to the user, the screen for instructing whether or not to permit delegation of the authority of the user to the client system; and in the resource service system, if access control information that is issued in response to an instruction given via the screen to permit delegation of the authority of the user is received from the client system, providing a service in response to confirmation of legitimacy of the access control information.

7. An access management service system that manages use of a service provided by a resource service system, comprising:

a holding unit configured to hold information of a user and information of a multi-tenant client system in a storage unit;

a registration unit configured to grant a first authority or a second authority to information of the client system and to register the same in the holding unit, the first authority being an authority permitting access not only to a specific tenant but also to another tenant, and the second authority being an authority permitting access to the specific tenant, wherein when granting an authority to information of the client system, if a certificate is received, the registration unit grants the first authority to the information of the client system, and if authentication information is received, the registration unit confirms a tenant based on the authentication information and grants the second authority permitting access of the confirmed tenant as the specific tenant to the information of the client system;

a determination unit configured to, if the second authority is granted to the client system when an authorization request for use of the service is received from the client system due to an instruction from a user having authority to use the service, determine whether a group to which the user belongs and a group to which the client system belongs match; and a presentation unit configured to, if the determination unit determines that the groups match or if the first authority is granted to the client system, present a screen to the user, the screen for instructing whether or not to permit delegation of the authority of the user to the client system.

8. A method for controlling an access management service system that manages use of a service provided by a resource service system, comprising:

holding information of a user and information of a multi-tenant client system in a storage unit;

granting a first authority or a second authority to information of the client system and registering the same in the storage unit, the first authority being an authority permitting access not only to a specific tenant but also to another tenant, and the second authority being an authority permitting access to the specific tenant, wherein when granting an authority to information of the client system, if a certificate is received, the first authority is granted to the information of the client system, and if authentication information is received, a tenant is confirmed based on the authentication information and the second authority permitting access of the confirmed tenant as the specific tenant is granted to the information of the client system;

wherein if the second authority is granted to the client system when an authorization request for use of the service is received from the client system due to an instruction from a user having authority to use the service, determining whether a group to which the user belongs and a group to which the client system belongs match; and wherein if it is determined that the groups match or if the first authority is granted to the client system, presenting a screen to the user, the screen for instructing whether or not to permit delegation of the authority of the user to the client system.

9. A non-transitory computer readable medium storing a program for causing a computer to function as:

a holding unit configured to hold information of a user and information of a multi-tenant client system in a storage unit;

a registration unit configured to grant a first authority or a second authority to information of the client system and to register the same in the holding unit, the first authority being an authority permitting access not only to a specific tenant but also to another tenant, and the second authority being an authority permitting access to the specific tenant, wherein when granting an authority to information of the client system, if a certificate is received, the registration unit grants the first authority to the information of the client system, and if authentication information is received, the registration unit confirms a tenant based on the authentication information and grants the second authority permitting access of the confirmed tenant as the specific tenant to the information of the client system;

a determination unit configured to, if the second authority is granted to the client system when an authorization request for use of the service is received from the client system due to an instruction from a user having authority to use a service provided by a resource service system, determine whether a group to which the user belongs and a group to which the client system belongs match; and a presentation unit configured to, if the determination unit determines that the groups match or if the first authority is granted to the client system, present a screen to the user, the screen for instructing whether or not to permit delegation of the authority of the user to the client system.

* * * * *